(12) United States Patent
Neteler

(10) Patent No.: US 6,531,197 B2
(45) Date of Patent: *Mar. 11, 2003

(54) DESICCANT BARRIER CONTAINER

(75) Inventor: Joachim Gregor Neteler, Redlands, CA (US)

(73) Assignee: Illinois Tool Works, Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/945,937

(22) Filed: Sep. 4, 2001

(65) Prior Publication Data

US 2002/0006483 A1 Jan. 17, 2002

Related U.S. Application Data

(63) Continuation of application No. 09/299,398, filed on Apr. 26, 1999, now abandoned.

(51) Int. Cl.$^7$ ............ B65D 30/08; B65D 30/02
(52) U.S. Cl. ............ 428/34.7; 428/35.2; 428/35.3; 428/458; 428/461; 428/476.1; 206/204; 206/484; 383/109
(58) Field of Search .......... 428/35.2, 34.5, 428/34.6, 34.7, 457, 458, 461, 476.1, 475.8, 480, 483, 35.3; 206/204, 484, 484.1; 383/109

(56) References Cited

U.S. PATENT DOCUMENTS

| | | | |
|---|---|---|---|
| 3,903,345 A | 9/1975 | Baker et al. | |
| 4,861,632 A | * 8/1989 | Caggiano | 206/204 |
| 5,095,626 A | 3/1992 | Kitamura et al. | |
| 5,350,622 A | 9/1994 | Speer et al. | |
| 5,529,833 A | 6/1996 | Speer et al. | |
| 5,667,863 A | * 9/1997 | Cullen et al. | 206/204 |

FOREIGN PATENT DOCUMENTS

EP 0 311 432 12/1989

OTHER PUBLICATIONS

Test & Measurement World; "Program Your Static–Shielding–Bag Tester"; Mar. 1994; p. 63–67.

Vogt, James A.; Moisture in Packaging: Selecting the Right Desiccant; Canadian packaging; Jun. 1995.

* cited by examiner

Primary Examiner—Rena L. Dye
(74) Attorney, Agent, or Firm—Stetina Brunda Garred & Brucker

(57) ABSTRACT

A container for containing moisture sensitive items has at least one wall having a desiccating agent wherein the desiccating agent absorbs moisture so as to inhibit such moisture from contacting moisture sensitive items contained within the bag. The wall preferably has a durable outer layer, a moisture barrier intermediate layer, and a desiccant containing inner layer. The desiccant containing inner layer preferably comprises microporous polyolefin impregnated with silica.

11 Claims, 1 Drawing Sheet

DESICCANT BARRIER CONTAINER

This application is a continuing application of Ser. No. 09/299,398, filed on Apr. 26, 1999, which is now abandoned.

FIELD OF THE INVENTION

The present invention relates generally to packaging materials and more particularly to a desiccant barrier container for containing moisture sensitive items, wherein the desiccant barrier container comprises microporous polyolefin impregnated with silica so as to absorb moisture and thereby inhibit the moisture from contacting moisture sensitive items contained within the container.

BACKGROUND OF THE INVENTION

Bags and the like for containing moisture sensitive items, such as electronic components, are well known. Moisture sensitive items are typically packaged within such moisture resistant bags at their place of manufacture and are typically only removed therefrom immediately prior to being utilized. Thus, the moisture sensitive items so packaged are generally isolated from moisture contained within the air, as well as from accidental moisture contamination through handling, e.g., leaks, spills, body fluids, etc.

Further, it is well known to include a desiccant, such as silica, within the moisture resistant package containing such items. Such desiccant is typically enclosed within a moisture permeable package such that the desiccant is isolated from the moisture resistant items packaged therewith and such that moisture is readily absorbed thereby. Thus, the moisture contained in the ambient air when the package is sealed, as well as any moisture subsequently entering the package is generally absorbed by the desiccant rather than substantially contaminating the moisture sensitive item contained therein.

Although the use of such moisture resistant packaging in combination with a desiccant has proven generally suitable for its intended purpose, it possesses inherent deficiencies which detract from its overall effectiveness and desirability.

For example, according to contemporary methodology, it is necessary to purchase and store such desiccants prior to their use. When needed, such desiccants must be retrieved from inventory, unpackaged, and, generally, manually placed within each moisture resistant package along with the moisture sensitive item contained therein. Thus, the use of such desiccants according to contemporary methodology requires substantial handling. As those skilled in the art will appreciate, the costs associated with the use of such contemporary desiccants thus includes not only their purchase price, but additionally the cost associated with the labor required for such handling.

As such, it is beneficial to provide a moisture resistant package which inhibits moisture contamination of moisture sensitive items contained therein and which does not require the addition of a separate desiccant.

SUMMARY OF THE INVENTION

The present invention specifically addresses and alleviates the above-mentioned deficiencies associated with the prior art. More particularly, the present invention comprises a container comprised of a moisture isolating material for containing moisture sensitive items. The container comprises at least one wall comprising a desiccating agent. The desiccating agent absorbs moisture contained within the container so as to inhibit any moisture disposed within the container from substantially contacting moisture sensitive items contained within the container.

According to the preferred embodiment of the present invention, the desiccating agent is integrally formed with at least a first wall of the container. The wall(s) with which such desiccating agent is integrally formed preferably comprise microporous polyolefin impregnated with silica.

Further, according to the preferred embodiment of the present invention, the wall(s) within which such desiccating agent is integrally formed comprise a durable outer layer and a desiccant containing inner layer. The wall(s) preferably further comprise a moisture barrier intermediate layer disposed between the durable outer layer and the desiccant containing inner layer.

The outer layer preferably comprises either polyester terrephlalate, nylon, heat and abrasion resistant lacquer, or polypropylene, and the intermediate layer preferably comprises a metal foil. A first adhesive layer is disposed intermediate the outer layer and the intermediate layer for bonding the outer layer to the intermediate layer. Similarly, a second adhesive layer is disposed intermediate the intermediate layer and the inner layer for bonding the intermediate layer to the inner layer. The first and second adhesive layers preferably comprise either solventless adhesive, solvent based adhesive, or extruded polymer, such as extruded polyethylene, extruded polyethylene copolymer, or extruded ionomers.

The container may optionally be configured so as to comprise at least one wall comprised of metal foil, to which said desiccant containing wall is attached so as to define a bag, for example. Thus, for a two-walled bag, for example, one of the walls comprises a desiccant containing inner layer and the other wall does not.

Thus, according to the present invention, various different containers, e.g., boxes, bags, etc., may be fabricated so as to provide a substantially moisture resistant enclosure to which additional desiccant does not need to be added in order to effectively protect moisture sensitive items from exposure to moisture. According to various alterative configurations of the present invention, either one or a plurality of the walls of such containers may be fabricated so as to integrally contain desiccant. The remaining walls need not contain such integral desiccant, but must be resistant to moisture permeation.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENTS

The detailed description set forth below in connection with the appended drawings is intended as a description of presently preferred embodiment of the present invention, and is not intended to represent the only form in which the present invention may be constructed or utilized. The description sets forth the functions and sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
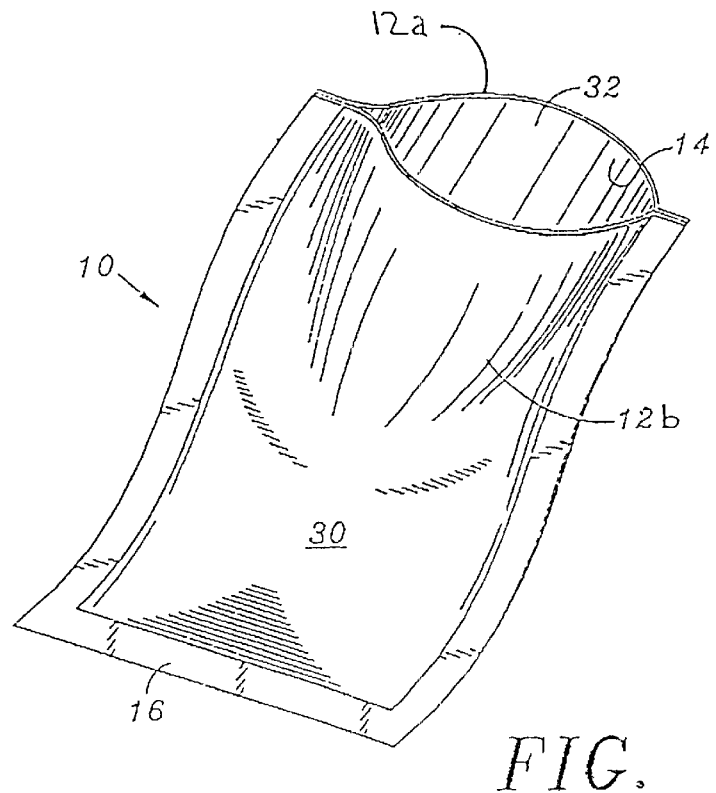
FIG. 1 is an exemplary container or bag formed to provide a moisture resistant desiccant barrier according to the present invention.
Figure 2:
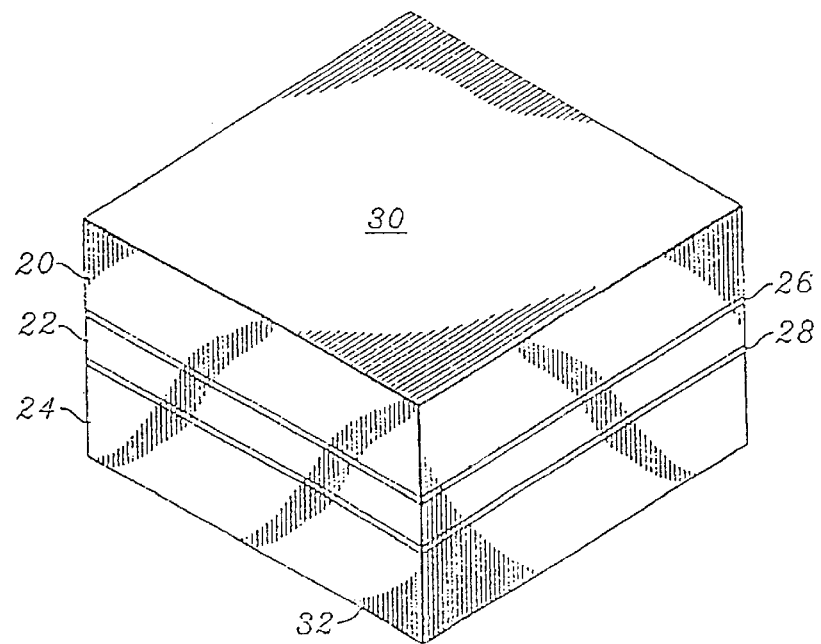
FIG. 2 is a cross section of a wall having outer, intermediate, and inner layers, as utilized in the construction of a moisture resistant desiccant barrier container according to the present invention.

The moisture resistant desiccant barrier container of the present invention is illustrated in FIGS. 1 and 2, which depict a presently preferred embodiment of the invention. Referring now to FIG. 1, one example of a container formed according to the present invention is a bag 10 having at least one wall 12a or 12b formed so as to comprise integrally formed desiccant upon the inner surface 32 thereof. Thus, either one or both of the two walls 12a or 12b is formed to comprise integrally formed desiccant, the other wall 12b or 12a is comprised of a moisture isolating material, so as to inhibit the flow of liquid into the bag, as discussed in detail below and lacks an integrally formed desiccant. Of course, both walls 12a and 12b may be comprised of integrally formed desiccant, if desired.

The two walls 12a and 12b are joined via seam 32, which may be formed via heat sealing, adhesively bonding, or otherwise formed in a manner which inhibits flow of liquid or moisture ladened air therethrough. In a similar manner, the opening 14 of the bag 10 may be sealed via heat sealing, adhesive bonding, or via the use of a zip-lock.

Referring now to FIG. 2, at least one wall of the bag 10 is preferably formed to have a durable outer layer 30 preferably formed of polyester terrephlalate, nylon, heat and abrasion resistant lacquer, or polypropylene. The durable outer layer 30 provides a gas barrier and also provides the strength and durability required of packaging materials. The durable outer wall 30 is bonded, preferably via adhesive layer 26, to a moisture barrier intermediate layer 22 which is preferably comprised of a metal foil, e.g., aluminum foil, tin foil, etc. The moisture barrier intermediate layer 22 is bonded to inner layer 24, preferably via adhesive layer 28. As those skilled in the art will appreciate, the particular adhesive materials utilized are dependent upon the chosen fabrication process. Solventless adhesive, waterborn adhesive, or solvent based adhesives may be utilized if an adhesive laminator is used. Alternatively, the adhesive layers are extruded polymers such as polyethylene or polyethylene copolymers or ionomers, which are preferably applied to the outer layer 30, immediate layer 22, and inter layer 24 in a sandwich-like fashion immediately after extrusion. Alternatively, the sandwiched layers are assembled and then heated to effect bonding. Thus, the three wall materials may be laminated together by either adhesive or extrusion lamination.

The inner layer 24, which defines the inner surface 32 of the bag 10, is preferably formed of microporous polyolefin impregnated with silica, so as to absorb moisture which is enclosed therein along with the moisture sensitive article, as well as any moisture which permeates the durable outer layer 30 and the moisture barrier intermediate layer 22.

Thus, the user need merely insert the moisture sensitive item into the container 10 of the present invention and seal the container 10, in order to achieve desired moisture resistant packaging. No separate desiccant needs to be added to the container, since such desiccant is formed integrally therewith. Thus, the need for separate desiccant packets is eliminated. Bags formed according to the present invention are suitable for either vacuum or ambient packaging of moisture sensitive items. The silica impregnated microporous polyolefin inner layer 24 is heat sealable to various polyolefins and heat seal lacquers, so as to facilitate the construction of various different containers therewith.

The moisture barrier material of the present invention is suitable for heat sealing to a foil laminate having a polyethylene inner layer so as to form a two-part bag. Thus, that wall of the two-part bag comprising integrally formed desiccant inhibits moisture formation within the bag. The moisture isolating material formed according to the present invention can also be sealed to itself via the use of heat-seal lacquer applied to one or both portions thereof which are to be sealed together, thereby facilitating the construction of various bags, boxes, and other packages.

After being fabricated, the moisture isolating material of the present invention is heated sufficiently to drive off any moisture absorbed during processing, handling, and storage prior to being formed into a container. Alternatively, the final, assembled container may be heated, as necessary.

Containers and/or materials formed according to the present invention are preferably packaged in a moisture resistant container, preferably also formed according to the present invention, so as to inhibit moisture absorption during shipping and storage thereof.

The durable outer layer 30 of the moisture isolating material provides an effective gas barrier and the metal foil intermediate layer 22 provides an effective barrier against moisture permeation. The durable outer layer 30 also provides an effective moisture barrier.

It is understood that the exemplary moisture resistant container described herein and shown in the drawings represents only a presently preferred embodiment of the invention. Indeed, various modifications and additions may be made to such embodiment without departing from the spirit.and scope of the invention. For example, as those skilled in the art will appreciate, various different configurations of containers are suitable for fabrication according to the present invention. Additionally, various different configurations of the moisture isolating material are contemplated. Thus, these and other modifications and additions may be obvious to those skilled in the art and may be implemented to adapt the present invention for use in a variety of different applications.

What is claimed is:

1. A container for containing moisture sensitive items, said container comprising at least one first wall comprising a durable non-desiccant containing outer layer, and an inner layer containing desiccating agent for adsorbing moisture, wherein said inner layer comprises a microporous polyolefin layer impregnated with moisture adsorbent silica such that said impregnated polyolefin layer is exposed to an inside of the containers.

2. The container as recited in claim 1 wherein said desiccating agent is integrally formed with said inner layer.

3. The container as recited in claim 1 wherein said first wall(s) comprises a moisture barrier intermediate layer disposed between the outer layer and the inner layer.

4. The container as recited in claim 3 wherein:
a) said outer layer comprises a material selected from the group consisting of:
   i) polyester terrephlalate;
   ii) nylon;
   iii) heat and abrasion resistant lacquer;
   iv) polypropylene, and
b) said intermediate layer comprises a metal foil.

5. The container as recited in claim 3 further comprising:
a) a first adhesive layer disposed intermediate said outer layer and said intermediate layer for bonding said outer layer to said intermediate layer; and b) a second adhesive layer disposed intermediate said intermediate layer and said inner layer for bonding said intermediate layer to said inner layer.

6. The container as recited in claim 4 wherein said first and second adhesive layers comprise at least one adhesive selected from the group consisting of:

a) solventless adhesive;

b) solvent based adhesive; and c) extruded polymers.

7. The container as recited in claim 5 wherein said first and second adhesive layers comprise at least one of extruded polyethylene or extruded polyethylene copolymer.

8. The container as recited in claim 1 further comprising at least one second wall comprised of metal foil to which said first wall(s) is attached so as to define a bag.

9. The container as recited in claim 1 wherein said first wall(s) is configured so as to define a bag.

10. The container as recited in claim 1 comprising two first walls bonded together to define a bag.

11. The container as recited in claim 10 further comprising a heat seal lacquer bonding said two first walls together.

* * * * *